US012208563B2

(12) United States Patent
Thaler et al.

(10) Patent No.: US 12,208,563 B2
(45) Date of Patent: Jan. 28, 2025

(54) DEEP-DRAWING APPARATUS AND PACKAGING MACHINE HAVING A DEEP-DRAWING APPARATUS

(71) Applicant: Harro Hoefliger Verpackungsmaschinen GmbH, Allmersbach im Tal (DE)

(72) Inventors: Andreas Thaler, Allmersbach im Tal (DE); Daniel Birkhold, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/483,327

(22) Filed: Oct. 9, 2023

(65) Prior Publication Data
US 2024/0116237 A1 Apr. 11, 2024

(30) Foreign Application Priority Data

Oct. 11, 2022 (EP) ..................................... 22200790

(51) Int. Cl.
*B29C 51/24* (2006.01)
*B29C 51/08* (2006.01)
(Continued)

(52) U.S. Cl.
CPC .............. *B29C 51/24* (2013.01); *B29C 51/08* (2013.01); *B29C 51/10* (2013.01); *B29C 51/36* (2013.01);
(Continued)

(58) Field of Classification Search
CPC ... B29C 51/08; B29C 51/10; B29C 2791/007; B29C 51/00; B29C 51/04
(Continued)

(56) References Cited

U.S. PATENT DOCUMENTS 3,347,011 A * 10/1967 Lovas ..................... B29C 51/18
53/511
3,837,782 A * 9/1974 Meissner ................ B65B 9/042
425/347

(Continued)

FOREIGN PATENT DOCUMENTS

DE 2 046 328 A1 5/1971

*Primary Examiner* — Jacob A Smith
(74) *Attorney, Agent, or Firm* — Walter Ottesen, P.A.

(57) ABSTRACT

A deep-drawing arrangement is for deep-drawing a continuously supplied film strip. The deep-drawing arrangement includes a transporter which revolves continuously around a fixed machine frame and which has plate elements and mold cavities and a cyclically timed deep-drawing apparatus, wherein the mold cavities can be acted on with a pressure reduction. The plate elements are permanently connected to each other via connection lines. A plate element is in the form of a connection element having at least one pressure reduction connection. The pressure reduction connection is connected to a pressure reduction source. The plate elements are permanently acted on with the pressure reduction during operation via the connection lines and the pressure reduction connection. Each plate element has at least one switching valve for connecting the pressure reduction which is permanently applied in the plate element to the associated mold cavities as required.

11 Claims, 2 Drawing Sheets

(51) Int. Cl.
  *B29C 51/10* (2006.01)
  *B29C 51/36* (2006.01)
  *B65B 43/08* (2006.01)
  *B65B 51/00* (2006.01)
  *B29K 105/00* (2006.01)
  *B29L 31/00* (2006.01)

(52) U.S. Cl.
  CPC .............. *B65B 43/08* (2013.01); *B65B 51/00* (2013.01); *B29K 2105/256* (2013.01); *B29L 2031/712* (2013.01)

(58) Field of Classification Search
  USPC .......................................................... 53/559
  See application file for complete search history.

(56) References Cited

U.S. PATENT DOCUMENTS

| | | | | |
|---|---|---|---|---|
| 3,920,371 | A * | 11/1975 | Faller | B29C 51/162 53/578 |
| 4,778,372 | A * | 10/1988 | Mutti | B29C 51/421 425/290 |
| 5,773,540 | A * | 6/1998 | Irwin | B29C 51/04 425/388 |
| 2004/0000128 | A1 * | 1/2004 | Di Lauretis | B65B 9/04 53/561 |

* cited by examiner

DEEP-DRAWING APPARATUS AND PACKAGING MACHINE HAVING A DEEP-DRAWING APPARATUS

CROSS-REFERENCE TO RELATED APPLICATIONS

This application claims priority of European patent application no. 22 200 790.8, filed Oct. 11, 2022, the entire content of which is incorporated herein by reference.

TECHNICAL FIELD

The disclosure relates to a deep-drawing apparatus and a packaging machine for producing filled bags using such a deep-drawing apparatus.

BACKGROUND

In a common embodiment, packaging units are often produced by films initially being deep-drawn. A product is poured into the film recesses which are thereby produced, after which a sealing is carried out using a covering film. There is produced a dual-layered film strip in which part-quantities of the product are separated from each other. These part-quantities are finally separated in a cutting station.

In particular in the domestic field, in the above-mentioned manner individual portions of detergent or cleaning agent are packaged by two strips of water-soluble film. For industrial large-scale production, packaging machines are used in continuous, non-timed operation. In this instance, a transporter, for example, in the form of a chain, revolves continuously around a fixed machine frame, wherein the transporter travels a straight, horizontal path on the upper processing side. Together with the transporter, plate elements with so-called format or die plates are also moved in a continuously rotating manner. Synchronously with the movement of the format plates, a first film strip is continuously supplied and placed on the upper side of the format plates. In the format plates, a plurality of mold cavities which are of great significance for the deep-drawing operation and also for the filling operation are formed.

In a previously known structural form, there is used a deep-drawing apparatus having a molding station which is also moved only over a part-distance synchronously with the respective format plate from a start position to an end position and is then moved cyclically again back to the start position. At the same time, the transport of the format plates and the film strip is further continuously maintained. During the travel from the start position to the end position, the film strip initially becomes heated to such a temperature that it can be plastically deformed. The film which can be deformed in this manner is then deep-drawn by means of an applied molding pressure reduction into the mold cavities. After the deep-drawing, the molding station moves back to its start position in order to heat the next portion of the film strip at that location and to deep-draw it into the mold cavities of a subsequent format plate.

After the deep-drawing operation has ended, it must be ensured that the film remains in the mold cavities in order to be able to receive the filling material which is intended to be subsequently introduced in sufficient quantities. Also, during the subsequent sealing operation, it is important that the lower film strip and the part-quantities of the product which have been introduced remain in place in order to be able to achieve a clean and fluid-tight sealing seam. Generally, the mold cavities are therefore acted on following the deep-drawing operation with a retention pressure reduction which retains the film strip in the deep-drawn mold thereof.

In order to achieve this, in the prior art apparatuses which are divided in two are known for producing a pressure reduction. A first portion, that is, a locally fixed molding pressure reduction device, is located at positions where the deep-drawing operation is taking place. Following in the movement direction, the second portion in the form of a retention pressure reduction device is also located in a fixed manner. In the continuous movement thereof, the format plates slide beyond both portions and are by means of corresponding channel connections sequentially first brought into connection with the molding pressure reduction device and then with the retention pressure reduction device. It is thereby possible to act on the mold cavities initially with a molding pressure reduction and subsequently independently thereof with a smaller though still sufficiently high retention pressure reduction.

During practical operation, some difficulties have to be overcome. As a result of the sliding relative movement of the format plates relative to the fixed pressure reduction channel, corresponding sealing means have to be provided. In spite of the high level of technical complexity, significant flow losses at the sealing locations cannot be avoided. The adjustment and maintenance of a desired low-pressure level is difficult. The transfer of the molding pressure reduction device to the retention pressure reduction device with a continuous reduced pressure path is also found to be difficult.

As a result of the relative movement of the format plate elements with respect to the fixed pressure reduction channel, high friction forces are produced. They have unfavorable influences on the drive and the drive power required, on the level of positioning precision with respect to the individual processing stations, for example, as a result of an expansion of the transport chain. The service-life of the transport chain is also reduced by the high loads resulting from the friction forces which have to be overcome.

In contrast to this, from the user viewpoint, there is a desire for increasingly high pressure reduction values.

SUMMARY

It is an object of the disclosure is to provide a deep-drawing apparatus in such a manner that an improved pressure reduction control is achieved. This object is, for example, achieved with a deep-drawing apparatus for deep-drawing a continuously supplied film strip. The deep-drawing arrangement includes: a transporter configured to revolve continuously around a fixed machine frame, the transporter having a plurality of plate elements and a plurality of mold cavities disposed in the plate elements; a cyclically timed, deep-drawing apparatus configured to run from a start position to an end position with the transporter and back to the start position from the end position, wherein the mold cavities are configured to be acted on with a pressure reduction; the plurality of plate elements being permanently connected to each other via a plurality of connection lines, wherein a first plate element of the plurality of plate elements is a connection element having at least one pressure reduction connection; the pressure reduction connection being connected to a pressure reduction source; the plurality of plate elements being configured to be permanently acted on with pressure reduction during operation via the plurality of connection lines and the pressure reduction connection; and, each of the plurality of plate elements having at least one switching valve for connecting the pressure reduction which is permanently applied in each of the plate elements to an associated one of the plurality of mold cavities as required.

It is a further object of the disclosure to improve a packaging machine for producing filled bags with regard to their efficiency. This object is, for example, achieved by a packaging machine for producing filled bags including: a deep-drawing arrangement for deep-drawing a continuously supplied film strip; the deep-drawing arrangement having a transporter and a cyclically timed, deep-drawing apparatus; the transporter being configured to revolve continuously around a fixed machine frame, the transporter having a plurality of plate elements and a plurality of mold cavities disposed in the plate elements; the cyclically timed, deep-drawing apparatus being configured to run from a start position to an end position with the transporter and back to the start position from the end position, wherein the mold cavities are configured to be acted on with a pressure reduction; the plurality of plate elements being permanently connected to each other via a plurality of connection lines, wherein a first plate element of the plurality of plate elements is a connection element having at least one pressure reduction connection; the pressure reduction connection being connected to a pressure reduction source; the plurality of plate elements being configured to be permanently acted on with pressure reduction during operation via the plurality of connection lines and the pressure reduction connection; each of the plurality of plate elements having at least one switching valve for connecting the pressure reduction which is permanently applied in each of the plate elements to an associated one of the plurality of mold cavities as required; and, a plurality of subsequent processing stations.

According to the disclosure, there is provision for the plate elements to be permanently connected to each other via connection lines, for a plate element to be in the form of a connection element having at least one pressure reduction connection and for the pressure reduction connection to be connected to a pressure reduction source. The plate elements are permanently acted on with the pressure reduction during operation by means of the connection lines and the pressure reduction connection. Each plate element has a switching valve for connecting the pressure reduction which is permanently applied in the plate element to the associated mold cavities as required.

As a result of the configuration according to the disclosure, a continuous, closed pressure reduction supply system for the retention pressure reduction and/or for the molding pressure reduction is provided. As a result of the closed structural form, it is, on the one hand, virtually free from leakages. On the other hand, during the movement operations, practically no occurrences of friction produced by the pressure reduction system have to be overcome. As a result of the lack of pressing forces to produce the sealing, the mechanical loads, in particular of the drive train, are low. Deformations under operating load are reduced to a minimum. The drive power required is low. The self-contained pressure reduction system enables increased reduced pressure values to be provided so that difficult process control operations can also be carried out.

For the connection of the revolving plate element which is in the form of a connection element to the pressure reduction plate, various possibilities may be considered. Preferably, there can be provided a pressure reduction device which includes the pressure reduction source, a carrier which is guided along the machine frame and which has at least one rotary transmission leadthrough and a flexible pressure reduction line between the pressure reduction source and the carrier. The pressure reduction connection of the plate element which is in the form of a connection element is connected via a connection line to the rotary transmission leadthrough of the pressure reduction device so as to transmit the pressure reduction.

For the movement of the individual components within the pressure reduction device, no individual drive is required. Instead, the revolving plate element pulls the carrier along the guide thereof in a back-and-forth movement. The rotary transmission leadthrough enables, on the one hand, the following of the corresponding plate element on the linear movement paths thereof in a process direction and in an opposing return direction. On the other hand, the rotary transmission leadthrough enables a cyclical rotational movement of the plate element during cyclical rotation about the machine frame. Consequently, the sealing of moving, pressure-reduction-guiding components is required only in the region of the rotary transmission leadthrough. Since at this location only a purely rotational movement occurs, such a sealing can be produced without relatively significant difficulties. The ease of operation of the arrangement is practically not impaired by such a sealing.

In an embodiment, the mold cavities can be acted on sequentially with a mold pressure reduction and a retention pressure reduction, wherein the pressure reduction connection is a retention pressure reduction connection, wherein the pressure reduction source is a retention pressure reduction source, and wherein the plate elements are permanently acted on with the retention pressure reduction during operation. In the embodiment, the pressure reduction which is provided as a retention pressure reduction is provided along the entire usable movement path of the plate elements. Without additional expenditure, the retention pressure reduction can be used at any desired location or at any processing station.

The switching valve which is present in each plate element enables the connection of the pressure reduction which is permanently available at any desired time. An individual switching-on or switching-over of individual die plates from a molding pressure reduction to a retention pressure reduction and vice versa is readily possible.

It may be advantageous for the molding pressure reduction and for the retention pressure reduction to provide different switching valves which can be operated separately from each other. In an embodiment, the switching valve which is present in the respective plate element is in the form of a switching valve for mutually acting on the mold cavities with the molding pressure reduction and with the retention pressure reduction. It is thereby possible with a simple structure and high level of operational reliability to ensure in particular the change from the initial molding pressure reduction to the following retention pressure reduction.

It may be advantageous with the above-mentioned arrangement to also carry out the feeding of the molding pressure reduction. In contrast to the retention pressure reduction, however, the molding pressure reduction does not have to be available over a relatively long path along a plurality of processing stations. Instead, it is sufficient for it to be available simply in the operating region of the deep-drawing apparatus. Preferably, therefore, the deep-drawing arrangement has an individual molding pressure reduction device which includes a molding pressure reduction source and a connection apparatus which is connected to the molding pressure reduction source, wherein the connection apparatus is part of the cyclically moving deep-drawing apparatus. The plate elements each have a molding pressure reduction connection. Correspondingly, the connection apparatus has at least one pressure reduction connector which is configured for cyclical connection to the molding pressure reduction connection.

An arrangement is thereby provided in which the connection apparatus cyclically moves back and forth with the remaining portions of the deep-drawing apparatus between a start position and an end position. During the movement in the working direction, the connection apparatus is connected via the pressure reduction connector thereof to the associated mold pressure reduction connection of the respective plate element, wherein it ensures a loss-free and friction-free provision of the molding pressure reduction. During the cyclical return movement, the connection apparatus is separated from the molding pressure reduction connection so that the continued movement of the plate elements is unimpeded. In particular in this instance, the connection apparatus has a plurality of, and advantageously four, pressure reduction connectors for cyclical connection to a corresponding number of plate elements so that they can be acted on simultaneously in a single working cycle with the molding pressure reduction for simultaneous deep-drawing.

In an advantageous further embodiment, the connection apparatus is configured with the at least one pressure reduction connector thereof to carry out a release movement which releases the pressure reduction connection and a closure movement which produces the pressure reduction connection, in each case with a direction component which is perpendicular to the movement direction of the plate elements. As a result of the corresponding release movement, the connection apparatus is moved apart from the moving plate elements so that there is no longer any mechanical contact. The movement of the plate elements is unimpeded in the released state. In particular, no friction between the connection apparatus and the moving plate elements can be formed. As a result of the connecting closure movement, the mentioned spacing is cancelled again. The connection apparatus is placed in a pressure-reduction-transmitting manner against one or more plate elements and is then also synchronously moved. In this instance, there are also no friction forces linked with the pressure reduction transmission so that on the whole a free movability of the plate elements is ensured with at the same time a high level of sealing of the pressure reduction guide.

In an embodiment, the plate elements each have a carrier plate which is connected to the revolving transporter and a die plate which is releasably connected to the carrier plate. The mold cavities are in this instance formed in the die plate while the carrier plates are connected to each other via the connection lines and furthermore in each case receive the above-mentioned at least one switching valve. By replacing the die plate, with little complexity a change of the mold cavities and consequently a change of the product geometry can be carried out while the pressure reduction guide and control according to the disclosure remains unaffected by this. The expenditure for machine retrofitting is in this instance reduced to a minimum.

BRIEF DESCRIPTION OF THE DRAWINGS

The invention will now be described with reference to the drawings wherein.

DETAILED DESCRIPTION

Figure 1:
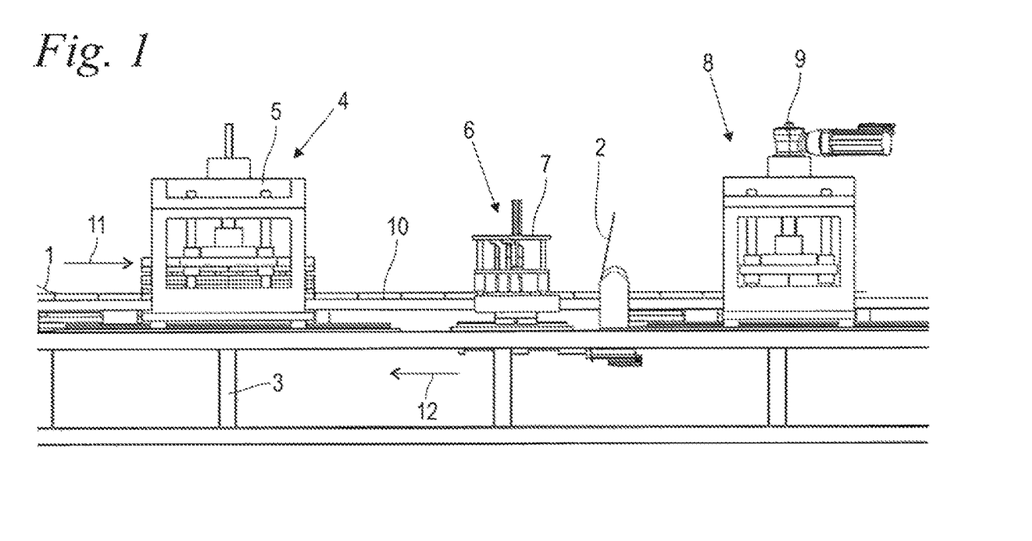
FIG. 1 shows a lateral cut-out of a packaging machine which is configured according to the disclosure and which has a transporter which is moved in a continuously revolving manner and with molding, filling and sealing stations which are also cyclically moved.

FIG. 1 shows a side view of a cut-out from a packaging machine according to the disclosure for producing filled bags. To this end, the packaging machine includes a machine frame 3, a molding station 4 having a deep-drawing apparatus 5, a filling station 6 having a filling apparatus 7 and a sealing station 8 having a sealing apparatus 9. A film strip 1 is supplied to the packaging machine and deep-drawn in the molding station 4 by means of the deep-drawing apparatus 5 so that recesses are formed in the film strip 1. These recesses are filled with a product in the filling station 6. Subsequently, a covering film 2 is supplied and sealed in the sealing station 8 onto the film strip 1, wherein the filled recesses are closed. In a cutting station which is not shown, the film unit which is formed in this manner is separated to form film bags. In the embodiment, the film strip 1 and the covering film 2 are water-soluble films, that is, PVOH films, between which a detergent or cleaning agent is packed. Filled film bags which are produced in this manner are, for example, placed in a dishwasher. The film material then dissolves in contact with water and releases the detergent contained. Accordingly, the same applies to the use of such a film bag in a washing machine.

The packaging machine includes a machine frame 3 which is mounted in a fixed manner and a continuously driven transporter 10. The transporter 10 may be a conveyor belt or the like and is in the embodiment shown formed by means of plate elements 14 which are connected to each other by means of link chains. On the plate elements 14, mold cavities 15 which are described in greater detail below (FIGS. 3, 4) for deep-drawing the film strip 1 and for retaining the recesses which are formed by means of the deep-drawing are formed in the film strip 1. The plate elements 14 are driven together with the transporter 10 continuously and rotationally around the machine frame 3, wherein for the actual production operation of the bags they move in an upper horizontal path in a movement direction indicated by an arrow. After the actual production operation and after corresponding redirection, they are subsequently guided back in the lower region of the machine frame 2 in the opposite direction in accordance with an arrow 12. The continuous film strip 1 is also continuously supplied and placed from above onto the plate elements 14 with the mold cavities 15. Between the filling station 6 and the sealing station 8, the covering film 2 is subsequently continuously supplied and placed from above onto the upper side of the film strip 1. The film strip 1 and the covering film 2 are in the positioned state also moved in the movement direction 11 synchronously and continuously with the transporter 10.

The station for supplying the film strip 1 and the station for supplying the covering film 2 are mounted in a fixed manner on the machine frame 3, as are stations which are not illustrated for application of water to support the sealing operation and for the perforation or lateral cutting of the films. The processes which are carried out in this instance are carried out in the same manner as the movement of the transporter 10 continuously. This is not the case for the molding station 4, the filling station 6 and the sealing station 8. The deep-drawing apparatus 5, filling apparatus 7 and sealing apparatus 9 thereof are not positioned in a fixed manner relative to the machine frame 3, but instead are partially also moved over a specific path synchronously with the transporter 10 in the movement direction 11. During this time, the film strip 1 is deep-drawn in the molding station 4 by means of the deep-drawing apparatus 5 which is also moved, in the filling station 6 the product to be packaged is introduced into the deep-drawn recesses by means of the moved filling apparatus 7, and in the sealing station 8 the covering film 2 is sealed onto the lower film strip 1 by means of the moved sealing apparatus 9. After the respective operation has finished, the deep-drawing apparatus 5, the filling apparatus 7 and the sealing apparatus 9 are cyclically moved back to their start position again, where a new cycle of the respective process which has been carried out then begins. At least the molding station 4 may, however, also be fixed, for example with a heating roller for heating the film strip to the deep-drawing temperature.

Figure 2:
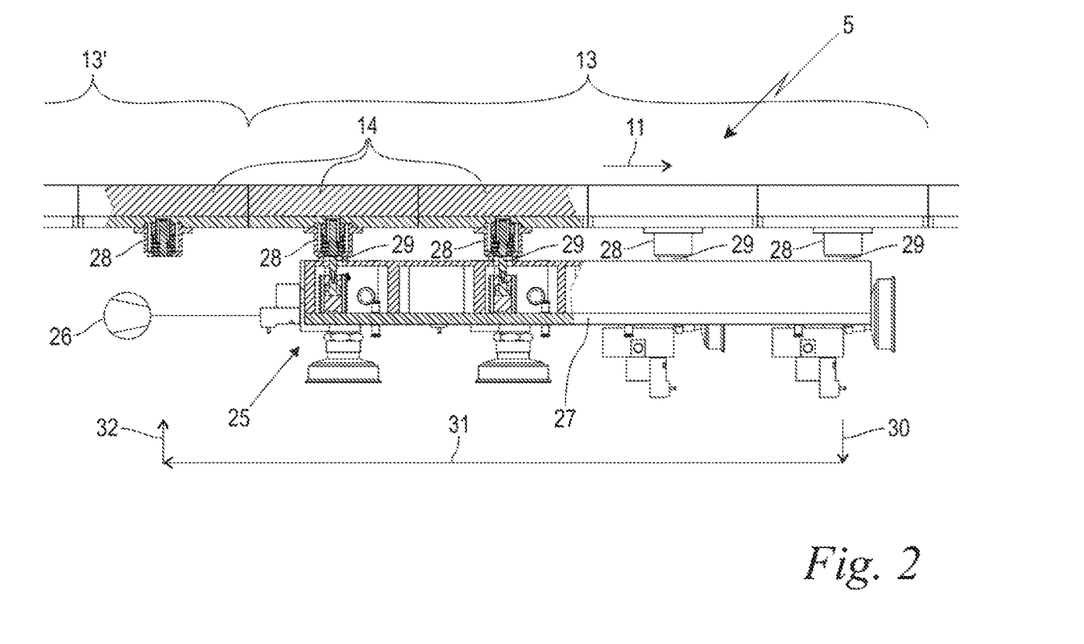
FIG. 2 shows an enlarged sectioned illustration of a portion of the molding station according to FIG. 1 having a connection apparatus which is connected to a plurality of plate elements in order to apply a deep-drawing pressure reduction.

FIG. 2 shows as an enlarged longitudinal sectioned illustration a cut-out from the deep-drawing apparatus 5 according to FIG. 1. The deep-drawing apparatus 5 may be configured to receive only a single plate element 14 and to deep-draw the film strip 1 at that location in a cycle. In the embodiment shown, the deep-drawing apparatus 5 is configured to simultaneously receive a plurality of, in this instance four, sequential plate elements 14. The four sequential plate elements 14 mentioned together form a plate set 13, wherein the deep-drawing apparatus 5 cyclically always receives a complete plate set 13. This does not necessarily also have to be the case for the subsequent filling and sealing stations 6, 8 (FIG. 1). In the embodiment shown according to FIG. 1, however, the filling station 6 and the sealing station 8 are configured for receiving and cyclically processing a complete plate set 13.

The deep-drawing arrangement which has already been described in connection with FIG. 1 and which is illustrated here only as a cut-out has a molding pressure reduction device 25. This includes a molding pressure reduction source 26 and a connection apparatus 27. The connection apparatus 27 is permanently connected to the molding pressure reduction source 26 so that during operation a switchable molding pressure reduction is permanently available in the connection apparatus 27. At the upper side, the connection apparatus 27 is provided with at least one pressure reduction connector 29. In the embodiment shown, a plurality of, in this instance a total of four, such pressure reduction connectors 29 are positioned on the upper side of the connection apparatus 27.

At the respective lower side thereof, the plate elements 14 each have a molding pressure reduction connection 28. The molding pressure reduction connections 28 and the pressure reduction connectors 29 are configured for cyclical production and cyclical release of the pressure reduction connection. In the illustration according to FIG. 2, the connection apparatus 27 is connected by means of the pressure reduction connectors 29 thereof in a pressure-reduction-transmitting manner to the molding pressure reduction connections 28 of an entire plate set 13, that is, to the molding pressure reduction connections 28 of a total of four plate elements 14. In this connected state, the connection apparatus 27 is pressed with the pressure reduction connectors 29 thereof in a sealing manner from below against the molding pressure reduction connections 28 of the plate elements 14. However, a mechanical coupling, for example, with a positive-locking connection or with engagement may also be advantageous. In any case, in the connected state, there is applied a pressure-tight, pressure-reduction-transmitting connection between the connection apparatus 27 and the connected plate elements 14.

Figure 4:
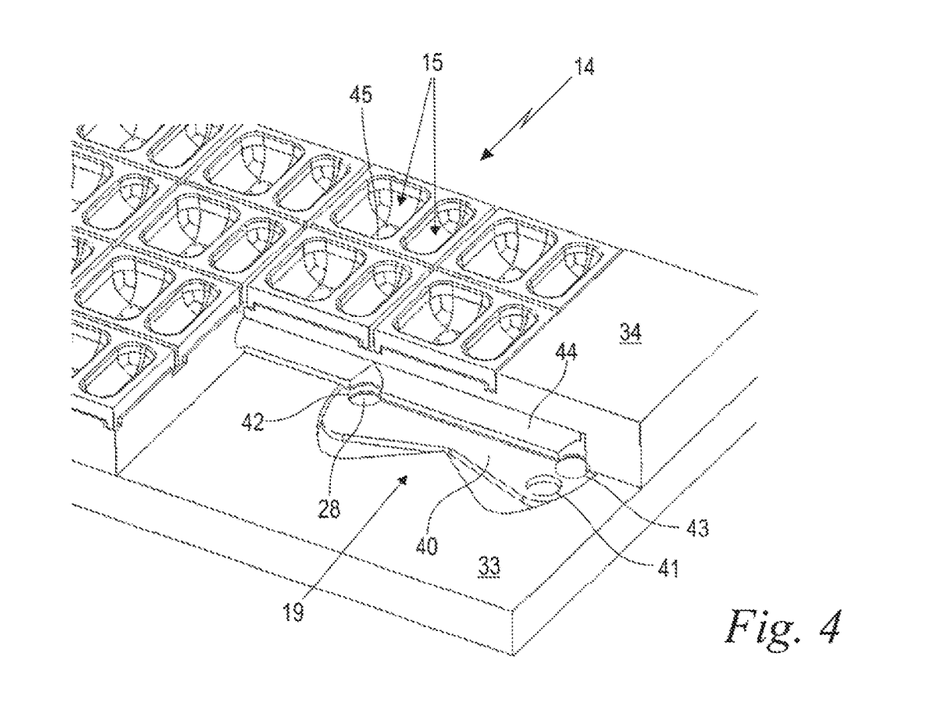

The connection apparatus 27 is part of the deep-drawing apparatus 5 which is described in greater detail in connection with FIG. 1 and is together therewith moved cyclically back and forth between the start and end positions which have already been mentioned above. In the connected state according to FIG. 2, the connection apparatus 27 runs in the movement direction 11 synchronously with the plate elements 14 from the start position to the end position. During this time, the mold cavities 15 shown in FIG. 4 are acted on with the molding pressure reduction applied by means of switching valves 19 which are also shown at that location so that the heated, plastically deformable film strip 1 is deep-drawn by means of the molding pressure reduction into the mold cavities 15.

After the deep-drawing operation has ended and when the end position is reached, the connection apparatus 27 with the pressure reduction connectors 29 thereof is separated from the molding pressure reduction connections 28 of the connected plate elements 14 and removed therefrom. The molding pressure reduction connections 28 on the plate elements 14 which are in use and also the associated pressure reduction connectors 29 are prior to separation individually automatically or independently closed by means of valves which are located therein and which are not illustrated in greater detail. The removal mentioned is carried out vertically in a downward direction. A release movement 30 which separates the pressure reduction connection is thus carried out with a direction component which is perpendicular to the movement direction so that the connection apparatus 27 is moved to a vertical spacing from the plate elements 14. The connection apparatus 27 which is released and lowered in this manner now moves together with the remaining deep-drawing apparatus 5 in a backward movement 31 backward so far that, in a subsequent, lifting closure movement 32, it is connected with a direction component which is also perpendicular to the movement direction 11 to the subsequent plate set 13' and moves again with this in the movement direction 11. During the attachment or connection, the valves which have already been mentioned are independently opened again in the molding pressure reduction connections 28 and in the pressure reduction connectors 29, whereby a pressure reduction-transmitting connection is produced again.

Figure 3:
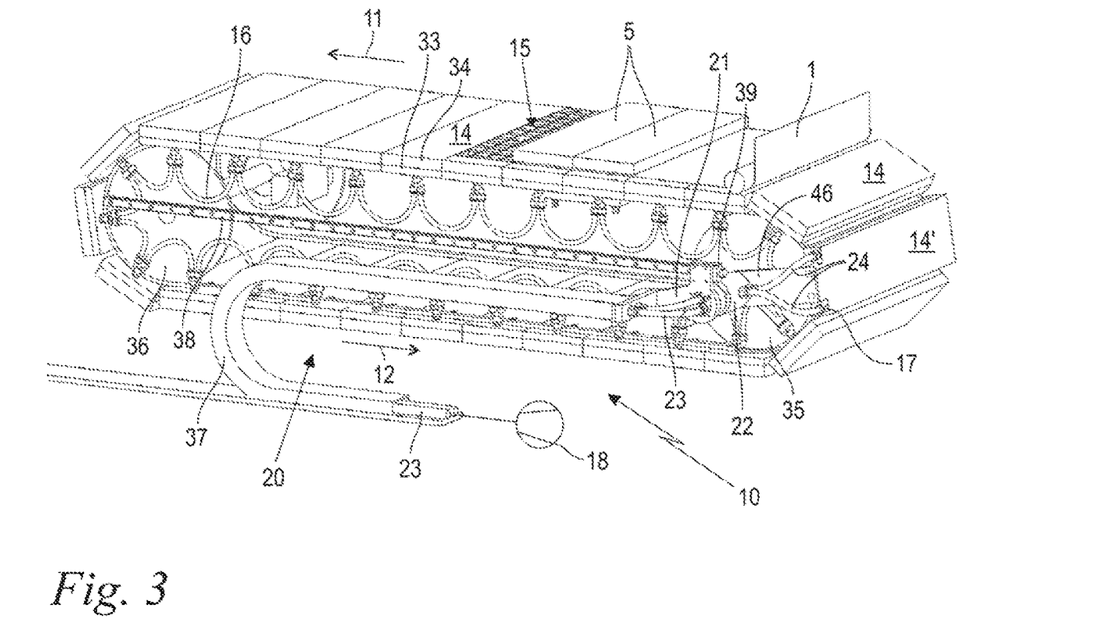
FIG. 3 shows a perspective, schematic illustration of the transporter according to FIG. 1 with plate elements which are connected to each other so as to transmit a pressure reduction and with a rotary transmission leadthrough, which is connected to a connection element in a co-rotating manner, of a retention pressure reduction apparatus; and, FIG. 4 shows a partially sectioned perspective illustration of one of the plate elements having a die plate, having a carrier plate and having a switching valve which is integrated in the carrier plate.

FIG. 3 shows as a perspective, schematic illustration the transporter 10 according to FIG. 1 with details for guiding the retention pressure reduction. The transporter 10 is in this instance for the sake of clarity illustrated to be shorter than in the actual packaging machine according to FIG. 1 and only in the region of the deep-drawing apparatus 5 in order to be able to better emphasize the technical details.

It can be seen in this instance that, at the upper sides of the plate elements 14, a matrix of mold cavities 15 is incorporated, wherein for greater clarity only one plate element 14 with such mold cavities 15 is illustrated. As already explained in connection with FIG. 1, the film strip 1 is placed during operation on the upper side of the plate elements 14 which are moved in the movement direction 11 and, in the deep-drawing apparatus 5 which is only indicated in this instance, are deep-drawn into the mold cavities 15 by means of the molding pressure reduction device 25 which is described above in connection with FIG. 2. After the deep-drawing operation is complete, the plate elements 14 run in the movement direction 11 further through the subsequent processing stations which are not illustrated in this instance, that is, through the filling station 6 and the sealing station 8 (FIG. 1). The molding pressure reduction in this instance no longer acts on the film strip 1, but is instead replaced by a retention pressure reduction which is described in greater detail below. The retention pressure reduction retains the deep-drawn film strip 1 in the mold cavities 15 at least during passage through the filling station 6 and the sealing station 8 (FIG. 1).

For acting on the mold cavities 15 with the mentioned retention pressure reduction, a plate element which is designated 14' in this instance is in the form of a connection element and provided with at least one, in this instance with two, pressure reduction connection(s) 17. Via these pressure reduction connections 17, the plate element 14' is connected in a pressure-reduction-transmitting manner to a pressure reduction source 18 in accordance with the following more detailed description. Furthermore, the plate element 14' which is in the form of a connection element corresponds in terms of its remaining features and reference numerals to the other plate elements 14. All the plate elements 14, 14' are connected by means of connection lines 16 so as to permanently transmit a pressure reduction. The connection lines 16 are formed in this instance by means of flexible hoses. However, they may also be fixed joint channels or the like. In any case, during operation via the connection lines 16 in all plate elements 14, 14' at each position of the revolution thereof, the pressure reduction level which is fed from the pressure reduction source 18 via the connection line 24 is available. During practical operation, a retention pressure reduction which may be smaller than the molding pressure reduction which has already been mentioned above, but which preferably has an identical but at least a similar pressure reduction level to the molding pressure reduction is introduced.

For the specific embodiment of the retention pressure reduction supply, the deep-drawing arrangement shown here in FIG. 3 has a pressure reduction device 20 which in addition to the pressure reduction source 18 already mentioned further includes a carrier 21 which is guided along the machine frame 3 (FIG. 1) having a rotary transmission leadthrough 22 and a flexible pressure reduction line 23 between the pressure reduction source 18 and the carrier 21. The carrier 21 is in this instance positioned laterally beside the revolving chain of plate elements 14 but may be arranged within the revolving path of the plate elements 14 or so as to extend between the pairs of redirection wheels 35, 36 which will be mentioned below. The same also applies to the connection lines 16. The pressure reduction source 18 is mounted in a fixed manner. The flexible pressure reduction line 23 which is connected thereto is retained in a towing chain 37 so that the opposing end thereof which is connected to the carrier 21 can follow the movement of the carrier 21. For the longitudinal movement of the carrier 21, there is laterally mounted beside the transporter 10 parallel with the movement direction 11 a guide rail 38 on which a carriage in the form of a ball recirculation carriage runs. On the ball recirculation carriage 39, the carrier 21 with the rotary transmission leadthrough 22 which is secured thereto is mounted. A rotatable starting portion of the rotary transmission leadthrough 22 is securely connected by means of a connection piece 46 to the plate element 14' which is in the form of a connection element.

The transporter 10 has at both ends thereof pairs of redirection wheels 35, 36 with which the revolving plate elements 14, 14' are redirected from the upper movement path with the movement direction 11 into the lower, counter-moving return path and back again in accordance with the arrow 12. The rotary transmission leadthrough 22 has a rotation axis which is parallel with the rotation axes of the redirection wheels 35, 36. The guide rail 38 is sized in such a manner that the carrier 21 can move back and forth from one redirection wheel 35 to the other redirection wheel 36 and back again. Furthermore, the guide rail 38 is positioned in such a manner that the rotary transmission leadthrough 22 which is secured to the carrier 21 at the end points of the linear movement thereof comes to rest coaxially with respect to one redirection wheel 35 or the other redirection wheel 36, respectively.

The plate element 14' which is in the form of a connection element is connected at the pressure reduction connections 17 thereof by means of at least one, in this instance two, connection line(s) 24 to the rotary transmission leadthrough 22 of the pressure reduction device 20 so as to transmit a pressure reduction. The pressure reduction provided by the pressure reduction source 18 is thus fed through the pressure reduction line 23, the carrier 21, the rotary transmission leadthrough 22 and the connection lines 24 into the plate element 14'. From there, it is distributed via the connection lines 16 over all the plate elements 14, where it is permanently available regardless of the current circumferential positions thereof.

In the illustration according to FIG. 3, the plate element 14' which is in the form of a connection element is located in the extremely right position thereof on the associated redirection wheel 35 so that the carrier 21 with the rotary transmission leadthrough 22 is also located there. During the 180° circulation thereof, the plate element 14' rotates about the rotation axis of the redirection wheel 35 with the same value of 180°. Since the rotary transmission leadthrough 22 is located in an axially identical position relative thereto, no compensating linear movement is required. The rotary transmission leadthrough 22 has in this instance only the function of permitting the relative rotational movement of the connection lines 24 relative to the carrier 21 which is retained in a non-rotatable manner. The rotation of the rotatable starting portion of the rotary transmission leadthrough 22 is brought about by the connection piece 46. Where applicable, however, the connection by means of the connection lines 24 may also be sufficient for this as long as they are sufficiently rigid.

Following the mentioned rotational movement, the plate element 14' carries out a linear working movement in accordance with the arrow 11, wherein via the connection piece 46 it also carries the carrier 21 along the guide rail 38 until it reaches the opposing redirection wheel 36. At that location, a 180° rotational movement is carried out again in a similar manner. This is followed again by a linear movement in the return direction 12, wherein the plate element 14' then carries the carrier 21 via the connection piece 46 back to the other redirection wheel 36 again until a complete revolution is achieved. Such a revolution can be repeated as often as desired, wherein all the plate elements 14, 14' are permanently supplied in the manner described above with the retention pressure reduction.

FIG. 4 shows as a partially sectioned perspective illustration one of the plate elements 14 which is representative of all the remaining plate elements 14, 14' which are constructed identically in terms of the features shown in this instance. Accordingly, the plate element 14 is made in several pieces with a lower carrier plate 33 and with a die plate 34 which is releasably connected to the carrier plate 33. The mold cavities 15 are formed in the die plate 34. The lower carrier plate 33 is connected to the transporter 10 (FIG. 3) so that the die plate 34 can be replaced, for example, for a format change with differently shaped mold cavities 15 without having to release the carrier plate 33 from the transporter 10.

The carrier plate 33 contains the at least one switching valve 19 which has already been mentioned above. Furthermore, the overview with FIG. 3 shows that the connection lines 16, in the case of the plate element 14' the connection lines 24, are also connected to the carrier plates 33 of the plate elements 14, 14' so that the plate elements 14, 14' are thus connected to each other by means of the carrier plates 33 thereof and the connection lines 16.

The switching valve 19 may be a switch-on/off valve, wherein a plurality of such switch-on/off valves may also be provided, for example, for independently connecting a molding pressure reduction and a retention pressure reduction. In the embodiment shown, the switching valve is in this instance in the form of a changeover valve for mutually acting on the mold cavities 15 with the molding pressure reduction and the retention pressure reduction. To this end, the switching valve 19 includes a valve member 40 which can be pivoted about a vertical axis and which is located in a corresponding recess in the carrier plate 33. The valve member 40 is provided at one end with a valve opening 41 and at the opposite end with an additional valve opening 42. In the switching position shown, the additional valve opening 42 overlaps the molding pressure reduction connection 28, while a retention pressure reduction supply 43 which is connected to the retention pressure reduction connection 17 is covered by the valve member 40. Accordingly, in the switching position shown, the molding pressure reduction is directed via the molding pressure reduction connection 28, the valve opening 42 in the valve member 40 and via a pressure reduction channel 44 to the different mold cavities 15, where it can develop by means of suction openings 45 in the base of the mold cavities 15 and act on the film strip 1 (FIG. 3) for the deep-drawing operation.

After the deep-drawing operation has ended, the switching valve 19 is changed over, wherein the valve opening 41 is caused to overlap the retention pressure reduction supply 43, while at the same time the molding pressure reduction connection 28 is covered by the valve member 40. In place of the molding pressure reduction, therefore, the retention pressure reduction is now fed from the retention pressure reduction supply 43 through the valve opening 41 and the pressure reduction channel 44 via the suction openings 45 into the mold cavities 15. At that location, the retention pressure reduction retains the deep-drawn film recesses in the mold cavities 15.

The switching-over between the molding pressure reduction and retention pressure reduction can be carried out individually for each individual plate element 14, 14'. A simple control of the switching valve 19 may, for example, be carried out by means of switching cams at specific selected positions of the machine frame 3 (FIG. 1) in a mechanical manner. However, other actuations of the switching valves 19, for example, in an electrical manner, are also conceivable.

Particularly when the deep-drawing pressure reduction and the retention pressure reduction are intended to have the same level, a limitation of the pressure reduction arrangement to the embodiment according to FIGS. 3 and 4 can be carried out while the deep-drawing pressure reduction concept according to FIG. 2 can be dispensed with. The pressure reduction provided via the arrangement according to FIGS. 3 and 4 can be used both as a deep-drawing pressure reduction and as a retention pressure reduction.

In the embodiment shown, however, a separate supply with a deep-drawing pressure reduction and retention pressure reduction is provided. In this instance, according to FIGS. 3, 4 the pressure reduction connection 17 is a retention pressure reduction connection, the pressure reduction source 18 is a retention pressure reduction source and the pressure reduction device 20 is a retention pressure reduction device. The plate elements 14, 14' are in this instance permanently acted on with the pressure reduction formed with the retention pressure reduction during operation. In a separate manner, the supply with the deep-drawing pressure reduction according to FIG. 2 is provided. Alternatively, however, a separate supply with a deep-drawing pressure reduction according to the same concept as the supply with the retention pressure reduction according to FIGS. 3, 4 may also be provided.

It is understood that the foregoing description is that of the preferred embodiments of the invention and that various changes and modifications may be made thereto without departing from the spirit and scope of the invention as defined in the appended claims.

The invention claimed is:

1. A deep-drawing arrangement for deep-drawing a continuously supplied film strip, the deep-drawing arrangement comprising:
    a transporter configured to revolve continuously around a fixed machine frame, said transporter having a plurality of plate elements and a plurality of mold cavities disposed in said plate elements;
    a cyclically timed, deep-drawing apparatus configured to run from a start position to an end position with said transporter and back to said start position from said end position, wherein said mold cavities are configured to be acted on with a pressure reduction;
    said plurality of plate elements being permanently connected to each other via a plurality of connection lines, wherein a first plate element of said plurality of plate elements is a connection element having at least one pressure reduction connection;
    said pressure reduction connection being connected to a pressure reduction source;
    said plurality of plate elements being configured to be permanently acted on with pressure reduction during operation via said plurality of connection lines and said pressure reduction connection; and,
    each of said plurality of plate elements having at least one switching valve for connecting the pressure reduction which is permanently applied in each of said plate elements to an associated one of said plurality of mold cavities as required.

2. The deep-drawing arrangement of claim 1 further comprising:
    a pressure reduction device which includes said pressure reduction source, a carrier guided along said machine frame, and at least one rotary transmission leadthrough;
    a flexible pressure reduction line between said pressure reduction source and said carrier; and, said pressure reduction connection of said first plate element which is in the form of said connection element is connected via a connecting line to said rotary transmission leadthrough of said pressure reduction device so as to transmit a pressure reduction.

3. The deep-drawing arrangement of claim 1, wherein said plurality of mold cavities are configured to be acted on sequentially with a mold pressure reduction and a retention pressure reduction; said pressure reduction connection is a retention pressure reduction connection; said pressure reduction source is a retention pressure reduction source; and, said plurality of plate elements are permanently acted on with said retention pressure reduction during operation.

4. The deep-drawing arrangement of claim 3, wherein said at least one switching valve is a changeover valve for mutually acting on said plurality of mold cavities with the mold pressure reduction and with the retention pressure reduction.

5. The deep-drawing arrangement of claim 3 further comprising:
   a mold pressure reduction device having a mold pressure reduction source;
   a connection apparatus connected to said mold pressure reduction source;
   said connection apparatus being part of said cyclically moving deep-drawing apparatus;
   said plurality of plate elements each having a mold pressure reduction connection; and,
   said connection apparatus having at least one pressure reduction connector configured for cyclical connection to said mold pressure reduction connection.

6. The deep-drawing apparatus of claim 5, wherein said connection apparatus has a plurality of pressure reduction connectors for cyclical connection to a corresponding number of said plurality of plate elements.

7. The deep-drawing apparatus of claim 5, wherein said connection apparatus has four pressure reduction connectors for cyclical connection to a corresponding number of said plurality of plate elements.

8. The deep-drawing arrangement of claim 5, wherein said plurality of plate elements are configured to be moved in a region of a mold station in a movement direction; and, said connection apparatus having said at least one pressure reduction connector is configured to carry out a release movement which releases said pressure reduction connection and a closure movement which produces said pressure reduction connection with a direction component perpendicular to said movement direction.

9. The deep-drawing arrangement of claim 1, wherein said plurality of plate elements each have a carrier plate connected to said revolving transporter and a die plate releasably connected to said carrier plate and said mold cavity of said carrier plate is formed in said die plate; and, said plurality of carrier plates are connected to each other via said connection lines and said carrier plates receive said switching valve.

10. A packaging machine for producing filled bags, comprising:
   a deep-drawing arrangement for deep-drawing a continuously supplied film strip;
   said deep-drawing arrangement having a transporter and a cyclically timed, deep-drawing apparatus;
      said transporter being configured to revolve continuously around a fixed machine frame, said transporter having a plurality of plate elements and a plurality of mold cavities disposed in said plate elements;
      said cyclically timed, deep-drawing apparatus being configured to run from a start position to an end position with said transporter and back to said start position from said end position, wherein said mold cavities are configured to be acted on with a pressure reduction;
   said plurality of plate elements being permanently connected to each other via a plurality of connection lines, wherein a first plate element of said plurality of plate elements is a connection element having at least one pressure reduction connection;
   said pressure reduction connection being connected to a pressure reduction source;
   said plurality of plate elements being configured to be permanently acted on with pressure reduction during operation via said plurality of connection lines and said pressure reduction connection;
   each of said plurality of plate elements having at least one switching valve for connecting the pressure reduction which is permanently applied in each of said plate elements to an associated one of said plurality of mold cavities as required; and,
   a plurality of subsequent processing stations.

11. The packaging machine of claim 10, wherein said plurality of subsequent processing stations includes a filling station and a sealing station.

\* \* \* \* \*

UNITED STATES PATENT AND TRADEMARK OFFICE
CERTIFICATE OF CORRECTION

| | |
|---|---|
| PATENT NO. | : 12,208,563 B2 |
| APPLICATION NO. | : 18/483327 |
| DATED | : January 28, 2025 |
| INVENTOR(S) | : A. Thaler et al. |

It is certified that error appears in the above-identified patent and that said Letters Patent is hereby corrected as shown below:

In the Specification

In Column 10:
Line 40: Delete "1800" and insert -- 180° --.
Line 59: Delete "1800" and insert -- 180° --.

Signed and Sealed this
Twenty-seventh Day of May, 2025

Coke Morgan Stewart
*Acting Director of the United States Patent and Trademark Office*